June 2, 1964  J. V. WERME  3,135,873
SEQUENTIAL MEASURING SYSTEM
Filed May 14, 1959
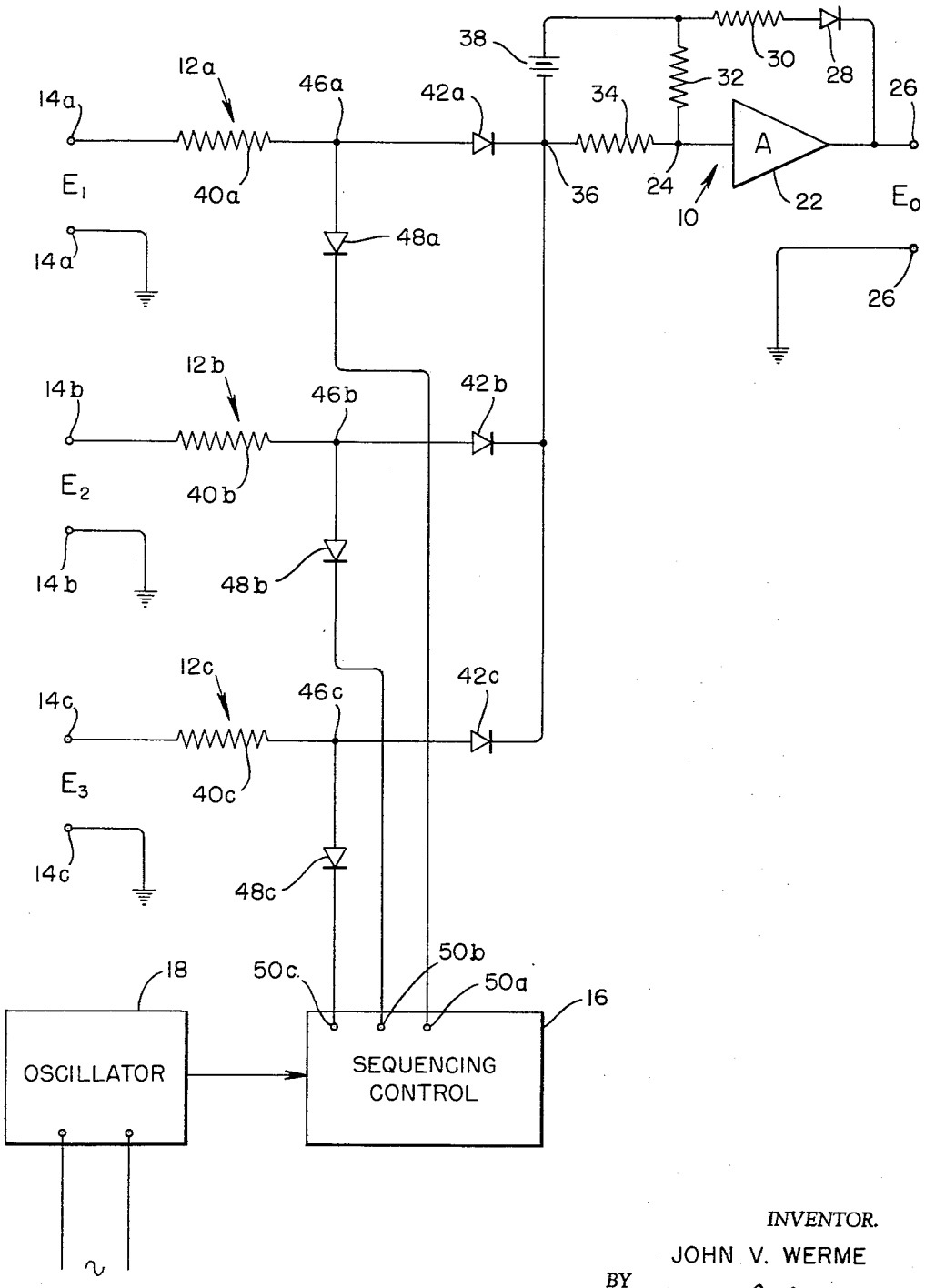
INVENTOR.
JOHN V. WERME
BY
*John F. Luhrs*
ATTORNEY

United States Patent Office 3,135,873
Patented June 2, 1964

3,135,873
SEQUENTIAL MEASURING SYSTEM
John V. Werme, Painesville, Ohio, assignor to Bailey Meter Company, a corporation of Delaware
Filed May 14, 1959, Ser. No. 813,290
12 Claims. (Cl. 307—88.5)

This invention relates to scanning apparatus and more particularly to apparatus for electronically scanning a plurality of signal channels.

In the past electrical scanning apparatus has employed either electro-mechanical type of channel selectors such as electric relays or employed electronic selector circuits for connecting the different signal channels to a measuring system. Obviously, with the electro-mechanical type of selector, the speed of scanning is limited by the characteristics of the mechanical parts. On the other hand, the completely electronic selectors have been generally complicated in circuitry, of high cost and difficult to service.

It is a principal object of this invention to scan a plurality of signal channels electronically with maximum speed and reliability.

Another object of the invention is to provide an improved electronic scanning system.

Other objects and advantages will become apparent from the following description taken in connection with the accompanying drawing which is a schematic illustration of a scanning apparatus embodying this invention.

Referring more particularly to the drawing, there is shown a scanning apparatus for scanning and measuring the signal level in a plurality of signal channels. In general, the apparatus includes a measuring circuit indicated generally by the reference numeral 10, and a plurality of identical input circuits or channels (in this case 3) 12a, 12b and 12c having input terminals 14a, 14b and 14c to which direct voltage signals $E_1$, $E_2$ and $E_3$ are applied respectively.

A sequencing control 16 is effective to normally produce an electrical effect in the input circuits to establish open circuit conditions and prevent the signals $E_1$, $E_2$ and $E_3$ from being impressed on the measuring circuit 10. The sequencing control however is responsive to the electrical signal pulses generated by an oscillator circuit 18 to sequentially produce an opposite electrical effect in each of the input circuits to sequentially cause a circuit to be completed from the input terminals of each input circuit to the measuring circuit 10. The input signals $E_1$, $E_2$ and $E_3$ are thus sequentially measured in measuring circuit 10.

Referring to the specific circuitry provided to accomplish this result, the measuring circuit 10 comprises a high gain low output impedance D.-C. amplifier 22 having an input terminal 24 and output terminals 26. The amplifier 22 is provided with an external negative feedback circuit comprising a diode rectifier element 28 connected in series with resistors 30 and 32 between the output terminal 26 and the input terminal 24.

Measuring circuits of this general nature are well known to those skilled in the art. The input current is maintained equal to the feedback current as the amplifier 22 operates to produce zero potential at terminal 24. Thus, the feedback voltage will be equal to the output voltage. The gain of the measuring circuit is determined by the relative values of the resistor 30 in the feedback circuit and the resistor 40 in the input circuits as will later be described. For a complete disclosure and description of the operation and analysis of such a circuit reference is made to copending application Serial No. 805,019, filed April 8, 1959, by Anthony J. Hornfeck et al.

A resistor 34 equal in value to the resistor 32 is connected in series with the terminal 24 and a second terminal 36 which is maintained at a predetermined potential below the potential of terminal 24, normally zero, through the provision of a suitable source such as a battery 38 connected across the resistors 32 and 34.

The input circuits 12 each comprise an input resistor 40 connected in series with a diode 42 between the terminals 14 and 36. As will be presently described in more detail when a predetermined electrical effect is produced in the input circuits the diodes 42 will conduct to apply the direct voltage input signals to the measuring circuit 10.

Each input circuit is provided with a junction or terminal 46 intermediate the diode 42 and input resistor 40 which is connected by a second diode element 48 to an output terminal 50 of the sequencing control 16. It is to be noted that each diode element 48 is arranged in polarity to be conductive when the potential at its associated terminal 50 is more negative than the potential at terminal 46 but to be nonconductive when the opposite circuit condition exists. Each diode element 42 is arranged in polarity to be conductive when the potential at terminal 46 is more positive than the potential at terminal 36 but to be nonconductive under opposite polarity conditions.

In operation of the disclosed embodiment, assume that each of the input voltages $E_1$, $E_2$ and $E_3$ is variable in a range of 0 to +10 volts and that the sequencing control 16 is effective to normally establish a —5 volt potential at each of the terminals 50a, 50b and 50c, but effective to sequentially establish a potential of +5 volts at these terminals at the frequency of the pulses generated by oscillator 18. Also assume that a voltage drop of .5 volt occurs across each diode element when the same is conductive and that the battery 38 and resistors 32 and 34 are sized to produce a potential of —1.5 volts at terminal 36 and +1.5 volts at the junction between resistors 32 and 30.

Considering the circuit conditions in measuring circuit 12a assume that at a particular instant the potential at terminal 50a is —5 volts and that the input voltage $E_1$ is +7 volts. Since the terminal 50a voltage is negative, the diode 48a will conduct establishing a .5 volt drop across diode 48a and a potential at terminal 46a of —4.5 volts. The potential of —4.5 volts at terminal 46a is more negative than the —1.5 volt potential at terminal 36 and back biases the diode 42a to establish an open circuit condition between terminal 46a and terminal 36. Thus, due to the electrical effect established by the —5 volt potential at terminal 50a, the input signal $E_1$ is blocked and is not applied to the measuring circuit 10.

Assume now that the sequencing control 16 has become effective to establish a +5 volt potential at terminal 50a. With this condition the voltage at terminal 46a would equal that at terminal 36 plus the voltage across diode 42a which now becomes conducting. The diode 48a is then back biased and nonconductive. Thus, as long as a potential of +5 volts exists at terminal 50a the input circuit 12a is in effect connected to the measuring circuit 10.

The following equation may be written for the input current $I_1$ to the measuring circuit 10 considering $R_{40a}$ as the value of resistor 40a, $E_{38}$ as the voltage of battery 38, $E_{42a}$ as the voltage across diode 42a, and $\frac{1}{2} E_{38}$ as the voltage across resistor 34.

$$I_1 = \frac{E_1 + \frac{1}{2}E_{38} - E_{42a}}{R_{40a}} \qquad (1)$$

If the gain of the amplifier 22 is high the feedback current $I_F$ through resistors 30 and 32 and diode 28 may be expressed as follows, considering $R_{30}$ as the resistance value of resistor 30, $\frac{1}{2}E_{38}$ as the voltage drop across resistor 32, $E_{28}$ as the voltage drop across diode element 28 and $E_0$ as the output voltage at terminals 26:

$$I_F = \frac{-E_0 - E_{28} + \frac{1}{2}E_{38}}{R_{30}} \quad (2)$$

As previously mentioned, the input current must equal the feedback current to maintain the potential at terminal 24 zero. Thus the input current $I_1$ may be equated to the feedback current $I_2$ in the following manner:

$$\frac{E_1 + \frac{1}{2}E_{38} - E_{42a}}{R_{40a}} = \frac{-E_0 - E_{28} + \frac{1}{2}E_{38}}{R_{30}} \quad (3)$$

If the diodes 28 and 42a are identical and the resistors 40a and 30 are of equal value, the gain will be unity and the last equation will reduce to the following:

$$-E_0 = E_1 \quad (4)$$

An important feature of the invention is the provision of a voltage bias such as established by the source 38 and the provision of diode 28 in the feedback circuit. Since the input current $I_1$ equals the feedback current $I_F$, the current flow through the diodes 28 and 42 will be equal. As a result of this equal current flow through diodes 28 and 42 and their identical characteristics, they will be affected equally by ambient temperature or other adverse conditions, and the errors will cancel out as shown by Equation 3. The source 38 by maintaining a negative potential at terminal 36 insures current flow through the diode 42 to maintain the dynamic resistance thereof low and to permit measurement of input voltages as low as zero volts. It is also to be noted that the source 38 voltage affects each side of Equation 3 equally, and thus any variation in the voltage will have no effect on the system.

Another important feature of the invention is the fact that the potential at terminal 50a need not be as large as the input voltage but only large enough to properly bias the diodes 48a and 42a.

Since the input circuits 12b and 12c are identical in circuitry to circuit 12a the above description and mathematical analysis of input circuit 12a will apply to the other input circuits when positive potentials of 5 volts appear at terminals 50b and 50c. It will be apparent that by sequentially producing positive potentials at terminals 50a, 50b and 50c the input signals $E_1$, $E_2$ and $E_3$ will be sequentially applied to the measuring circuit 10 as a result of electrical effects sequentially produced in each input circuit. As this "switching" action is completely electronic and the circuitry involved is simple in nature, extremely high scanning speeds may be achieved in the order of 100,000 cycles per second.

While only one embodiment of the invention has been herein shown and described, it will be apparent to those skilled in the art that many changes may be made in the construction and arrangement of parts without departing from the scope of the invention as defined in the appended claims.

What I claim as new and desire to secure by Letters Patent of the United States is:

1. In a scanning apparatus, in combination, a measuring circuit having an input terminal and an output terminal, a D.-C. amplifier connected between said terminals, a negative feed-back circuit connected in parallel with said amplifier between said input and output terminals including a feedback impedance having one end connected to said output terminal, means for maintaining the potential of the other end of said impedance a predetermined amount above the potential of said input terminal, an input circuit including an input impedance, a diode connected between said input impedance and said input terminal, a junction connected to one end of said diode, and means for maintaining the potential of said junction a predetermined amount below the potential of said input terminal.

2. In a scanning apparatus as claimed in claim 1 wherein said second named means maintains the potential of said junction the same amount below the potential of said input terminal as said first named means maintains the potential of said impedance above the potential of said input terminal.

3. In a scanning apparatus as claimed in claim 2 wherein a second diode is connected in said feed-back circuit between the output terminal and said feedback impedance.

4. In a scanning apparatus as claimed in claim 3 including means for sequentially applying a reverse bias voltage across the first said diode to operatively disconnect said input circuit from said measuring circuit and thereafter to remove said reverse bias voltage to operatively connect said input circuit to said input terminal.

5. In a scanning apparatus, in combination, a measuring circuit having an input terminal and output terminal, a D.-C. amplifier connected between said terminals, a voltage divider network including a source of D.-C. potential and two equal resistances connected in series across said source, a connection from said input terminal to the junction between said resistances, a negative feed-back circuit connected between said terminals including one of said resistances, a feedback impedance and a diode connected in series in said feedback circuit, and a plurality of input circuits each including an input impedance and a diode connected in series with the other of said resistances.

6. In a scanning apparatus as claimed in claim 5 including means for applying a reverse bias voltage across each of the diodes connected in said input circuits to maintain said input circuits operatively disconnected from said measuring circuits and means for sequentially removing said reverse bias from each of said diodes to thereby operatively connect each of said input circuits in turn with said measuring circuit.

7. In a measuring and scanning apparatus, the combination comprising, a measuring circuit including a direct voltage amplifier having an input and output, an external negative feedback circuit comprising a feedback impedance connected between said input and output, an input circuit connected to said amplifier input including an input impedance connected in series with an input terminal, said input circuit forming a summing junction with said feedback circuit of substantially zero potential at said amplifier input, a rectifier element electrically connected in series with said input impedance and said summing junction arranged to be forward biased by said input signal to conduct the same, means for reverse biasing said rectifier element to control the application of said input signal to said measuring circuit, means for establishing a bias potential between said rectifier element and said summing junction to insure forward biasing of said rectifier element by the minimum value of said input signal, and means for establishing a potential equal to said bias potential in said feedback circuit to compensate for the effect of said bias potential on said measuring circuit.

8. In a measuring and scanning apparatus as claimed in claim 7 further including a second rectifier element connected in said feedback circuit in series with said feedback impedance and said compensating potential to also compensate for the effect of said first rectifier element on said measuring circuit.

9. In a measuring and scanning apparatus as claimed in claim 8 wherein said bias potential establishing means comprises a resistance connected between said rectifier element and said summing junction and said compensating potential establishing means comprises an equal resistance connected in series between said feedback impedance and said summing junction, and a direct voltage source is connected across said resistances to produce a voltage drop across each of said resistances equal to one-half the potential of said source.

10. In a measuring and scanning apparatus as claimed in claim 9 wherein said reverse biasing means comprises, means for selectively establishing potentials of two different magnitudes, a third rectifier element connected between the last said means and the junction of the first said rectifier element and said input impedance, said third rectifier element being conductive in response to one of said potentials to reverse bias said first rectifier element and non-conductive in response to the other of said potentials to permit forward biasing of said first rectifier element by said input signal.

11. In a measuring apparatus, the combination comprising, a direct voltage amplifier having an input and output terminal, said amplifier having an external feedback circuit, an input circuit connected to said amplifier input and including an input terminal for a direct voltage input signal variable in a predetermined range, a rectifier element electrically connected between said input circuit and the input of said direct voltage amplifier, said rectifier element having a polarity arrangement to be forward biased by said input signal to conduct the same, means for establishing a biasing potential opposite in polarity between said rectifier element and said direct voltage amplifier to insure forward biasing of said rectifier element at the minimum value of said input signal, and means for establishing a potential in said feedback circuit to compensate for the effect of said biasing potential on said direct voltage amplifier.

12. In a measuring and scanning apparatus, the combination comprising, a measuring circuit having an input and output, an input circuit connected to said input and including an input terminal for a direct voltage input signal variable in a predetermined range, a first rectifier element electrically connected between said input terminal and said measuring circuit input and having a polarity arrangement to be forward biased by said input signal to conduct the same, means for establishing a potential between said first rectifier element and said measuring circuit input to insure forward biasing of said first rectifier element by said input signal at the minimum value thereof, means for introducing a compensating potential in said measuring circuit equal to said established potential between said first rectifier element and said measuring circuit input to compensate for the effect of the same, means for selectively establishing bias signals having two different magnitudes, a second rectifier element connected between the last said means and the input terminal side of said first rectifier element, said second rectifier element having a polarity arrangement to be conductive when one of said bias signals is established to reverse bias said first rectifier element and establish a state of non-conduction thereof with respect to said input signal, said second rectifier element being non-conductive when the other of said bias signals is established to render said first rectifier element conductive with respect to said input signal.

References Cited in the file of this patent
UNITED STATES PATENTS

| | | |
|---|---|---|
| 2,801,296 | Blecher | July 30, 1957 |
| 2,820,855 | Sherr | Jan. 21, 1958 |
| 2,828,450 | Pinckaers | Mar. 25, 1958 |
| 2,836,734 | Chichanowicz | May 27, 1958 |
| 2,877,451 | Williams | Mar. 10, 1959 |
| 2,887,542 | Blair et al. | May 19, 1959 |
| 2,958,857 | Johnson et al. | Nov. 1, 1960 |
| 2,964,708 | Steele | Dec. 13, 1960 |
| 2,965,887 | Yostpille | Dec. 20, 1960 |
| 2,984,826 | Reed | May 16, 1961 |